United States Patent
Stenneth

(10) Patent No.: US 10,657,394 B2
(45) Date of Patent: May 19, 2020

(54) METHOD AND SYSTEM FOR HANDLING MISCLASSIFICATION OF SPEED SIGNS

(71) Applicant: HERE GLOBAL B.V., Eindhoven (NL)

(72) Inventor: Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 98 days.

(21) Appl. No.: 16/034,200

(22) Filed: Jul. 12, 2018

(65) Prior Publication Data

US 2020/0019798 A1 Jan. 16, 2020

(51) Int. Cl.
*G06K 9/00* (2006.01)
*B60W 50/14* (2020.01)
(Continued)

(52) U.S. Cl.
CPC ......... *G06K 9/00818* (2013.01); *B60W 50/14* (2013.01); *G06T 1/0007* (2013.01); *B60W 2550/22* (2013.01); *B60W 2550/302* (2013.01); *G06F 17/18* (2013.01); *G06K 2209/23* (2013.01); *G06T 2207/30256* (2013.01)

(58) Field of Classification Search
CPC ......... G06K 9/00818; G06K 2209/23; B60W 50/14; B60W 2550/22; B60W 2550/302; G06T 1/0007; G06T 2207/30256; G06F 17/18
See application file for complete search history.

(56) References Cited

U.S. PATENT DOCUMENTS 8,918,277 B2  12/2014  Niem et al.
9,218,535 B2  12/2015  Wey et al.
(Continued)

FOREIGN PATENT DOCUMENTS

DE  102007004453 A1  7/2008
WO  2015121546 A1  8/2015

OTHER PUBLICATIONS

Carrasco et al., "Recognition Stage for a Speed Supervisor Based on Road Sign Detection", Article, Sensors 2012, Published Sep. 5, 2012, retrieved from http://www.mdpi.com/1424-8220/12/9/12153/pdf, pp. 12153-12168.

*Primary Examiner* — Tom Y Lu
(74) *Attorney, Agent, or Firm* — Ditthavong & Steiner, P.C.

(57) ABSTRACT

A method, system, and computer program product is provided, for example, for assisting a user of the vehicle in following a prescribed speed limit while travelling in the vehicle. The method comprises providing a speed limit related recommendation to the user of the vehicle. The method further comprises receiving an image data representing a posted sign, in a vicinity of the vehicle, the image data being detected by one or more image capturing devices. Additionally, the method comprises processing the image data received to determine an observed numerical value. The method further comprises calculating, by a processor, a sign reliability factor based on a function of at least the observed numerical value, a historic mean of one or more vehicle speeds at the time of sign observation and a standard deviation of the one or more vehicle speeds at the time of sign observation. Additionally, the method may include providing data for an indication of the speed limit to be followed by the vehicle.

20 Claims, 8 Drawing Sheets

(51) Int. Cl.
*G06T 1/00* (2006.01)
*G06F 17/18* (2006.01)

(56) References Cited

U.S. PATENT DOCUMENTS

| | | | | |
|---|---|---|---|---|
| 9,704,395 B2* | 7/2017 | Takiguchi | .......... | G08G 1/09623 |
| 9,847,021 B2* | 12/2017 | McClellan | ............ | G01S 5/0027 |
| 10,046,763 B2* | 8/2018 | Inoue | .................... | B60W 50/14 |
| 10,339,398 B2* | 7/2019 | Fotta | .................. | G06K 9/00818 |

* cited by examiner

METHOD AND SYSTEM FOR HANDLING MISCLASSIFICATION OF SPEED SIGNS

TECHNOLOGICAL FIELD

The present disclosure generally relates to a system and method for assisting a driver of a vehicle, and more particularly relates to a system and method for providing classification of road signs for use during provision of driver and/or vehicle assistance.

BACKGROUND

The automotive industry is rapidly transitioning towards autonomous vehicles with the introduction of many advanced vehicle mobility solutions. Such advanced vehicle mobility solutions require automation of many driving functions. The purpose of this automation is to reduce the burden of taking driving decisions on the driver. Thus, such automation requires a high degree of precision and accuracy to be able to replicate an efficient decision making process and reduce the reaction time based response in all driving situations. One such driving situation may be following prescribed speed limits while driving through different regions, road segments and geographies.

Currently, speed limit data related to traffic regulations are mostly determined using vehicle based sensors. However, such recognition of speed limit data may not be 100% accurate. Thus, there exists a need in the art for improved methods and systems for determining and following prescribed speed limit regulations while driving.

BRIEF SUMMARY

In light of the above-discussed problems, there is a need to provide methods and systems that can augment vehicle sensor based speed limit data recognition. More specifically, there exists a need for technologies that can provide correct classification of signs posted on a link, such as roadways, highway segments, gantries, freeways and the like, for providing more reliable driving assistance solutions in vehicles.

One such technology that may be able to successfully augment the vehicle based sensing of posted signs, such as road signs and speed limit signs is a map based determination. A digital map may provide information that is complementary to a vehicle's on-board sensor data and driver cognition based information to enhance the assistance functions implemented in the vehicle.

The map based solutions disclosed in the methods and systems provided herein may provide a very high level of accuracy in classification of posted signs via ingestion of vehicle smart sensor data and analysis, coding and distribution of relevant information derived from the sensor data and conflated with other sources. Further, the methods and systems disclosed herein may provide for using data from vehicle sensors, such as an image capturing device installed in the vehicle, to update a road sign database and/or a map database every few hours. Such data may be crowd-sourced from thousands of vehicles. Thus, the map database may be updated in near real times and volatile speed limit signs such as those for road works and constructions can be learned within a few hours after they are posted.

In one example embodiment, a method for providing a speed limit related recommendation to a user of a vehicle may be provided. The method may include receiving an image data representing a posted sign, in a vicinity of the vehicle, the image data being detected by one or more image capturing devices. The method may further include processing the received image data to determine an observed numerical value. The method further includes calculating, by a processor, a sign reliability factor based on a function of at least the observed numerical value, a historic mean of one or more vehicle speeds at the time of sign observation and a standard deviation of the one or more vehicle speeds at the time of sign observation. Additionally, the method may include providing data for an indication of the speed limit to be followed by the vehicle, on a user interface, based on the sign reliability factor of the observed numerical value being above or below a pre-defined threshold.

In some example embodiments, a navigation system is provided. The navigation system may include a user interface to provide a speed limit related recommendation to a user of a vehicle. The navigation system may further include at least one processor and at least one non-transitory memory including computer program code instructions. The computer program code instructions configured to, when executed, cause the system to at least: receive an image data representing posted sign, in a vicinity of the vehicle, the image data being detected by one or more image capturing devices. The computer program code instructions configured to further process the image data received to determine an observed numerical value. The computer program code instructions configured to further calculate, using a processor, a sign reliability factor based on a function of at least the observed numerical value, a historic mean of one or more vehicle speeds at the time of sign observation and a standard deviation of the one or more vehicle speeds at the time of sign observation. The computer program code instructions configured to further provide data for an indication of the speed limit to be followed by the vehicle, on a user interface, based on the sign reliability factor of the observed numerical value being above or below a pre-defined threshold.

In some example embodiments, a computer program product is provided. The computer program product comprising at least one non-transitory computer-readable storage medium having computer-executable program code instructions stored therein, the computer-executable program code instructions comprising program code instructions to receive an image data representing a posted sign, in a vicinity of the vehicle, the image data being detected by one or more image capturing devices. The computer-executable program code instructions further comprising program code instructions to process the image data received to determine an observed numerical value. The computer-executable program code instructions also comprising program code instructions to calculate a sign reliability factor based on a function of at least the observed numerical value, a historic mean of one or more vehicle speeds at the time of sign observation and a standard deviation of the one or more vehicle speeds at the time of sign observation. The computer-executable program code instructions further comprising program code instructions to provide data for an indication of the speed limit to be followed by the vehicle, based on the sign reliability factor of the observed numerical value being above or below a pre-defined threshold.

In some example embodiments, a method for providing a validation for a posted sign is provided. The method comprises: receiving an image data representing a posted sign, in a vicinity of a vehicle, the image data being detected by one or more image capturing devices; processing the image data received to determine an observed numerical value; calculating, by a processor, a sign reliability factor based on a function of at least the observed numerical value, a historic mean of one or more vehicle speeds at the time of sign observation and a standard deviation of the one or more vehicle speeds at the time of sign observation; and providing data for determining a validation status for the posted sign based on the sign reliability factor of the observed numerical value being above or below a pre-defined threshold.

In some example embodiments, a navigation system is provided. The navigation system comprises at least one processor and at least one non-transitory memory including computer program code instructions, the computer program code instructions configured to, when executed, cause the system to at least: receive an image data representing a posted sign, in a vicinity of a vehicle, the image data being detected by one or more image capturing devices. The program code instructions configured to, when executed, further cause the system to process the image data received to determine an observed numerical value; calculate, using the processor, a sign reliability factor based on a function of at least the observed numerical value, a historic mean of one or more vehicle speeds at the time of sign observation and a standard deviation of the one or more vehicle speeds at the time of sign observation; and providing data for determining a validation status for the posted sign based on the sign reliability factor of the observed numerical value being above or below a pre-defined threshold.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
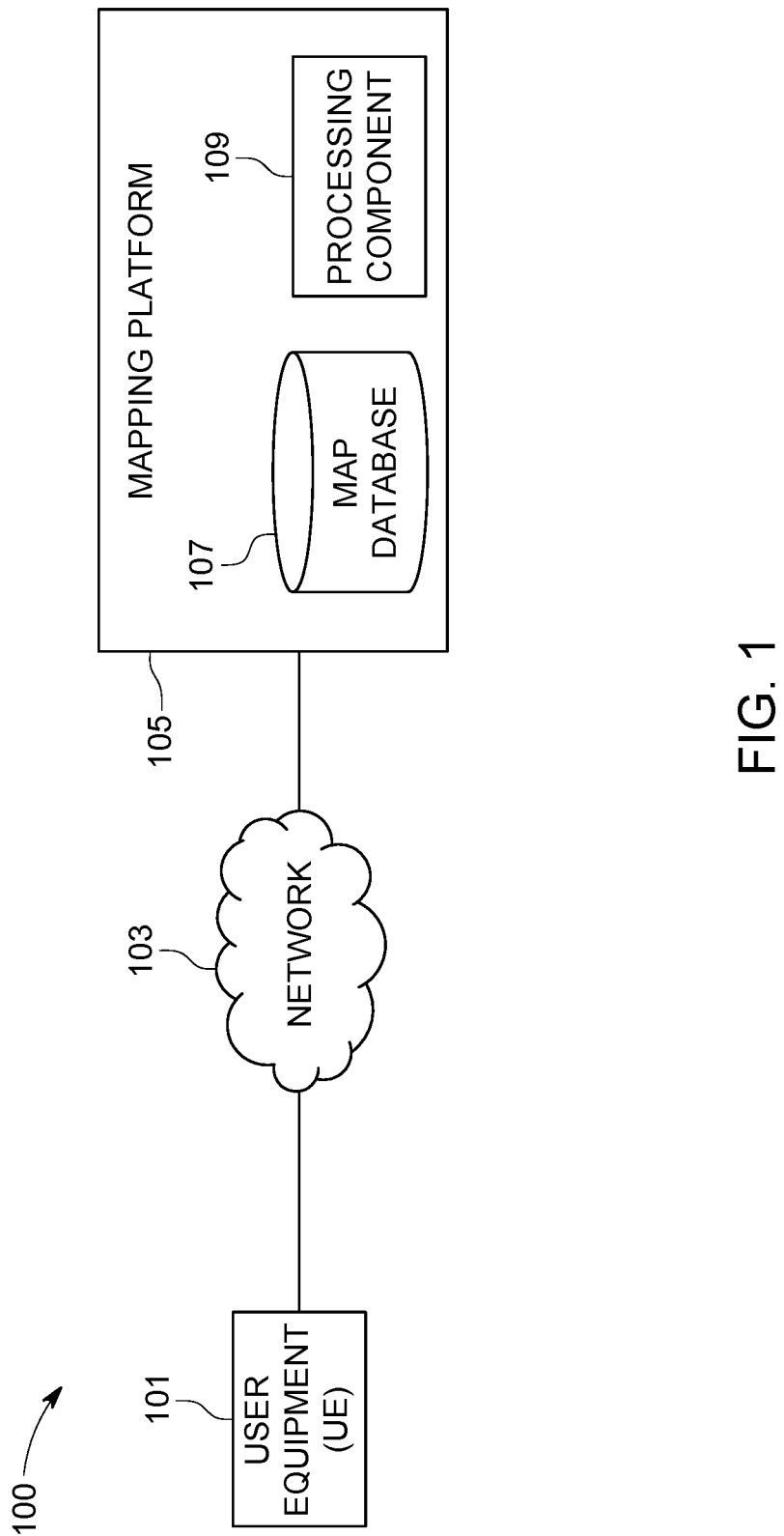
Figure 2:
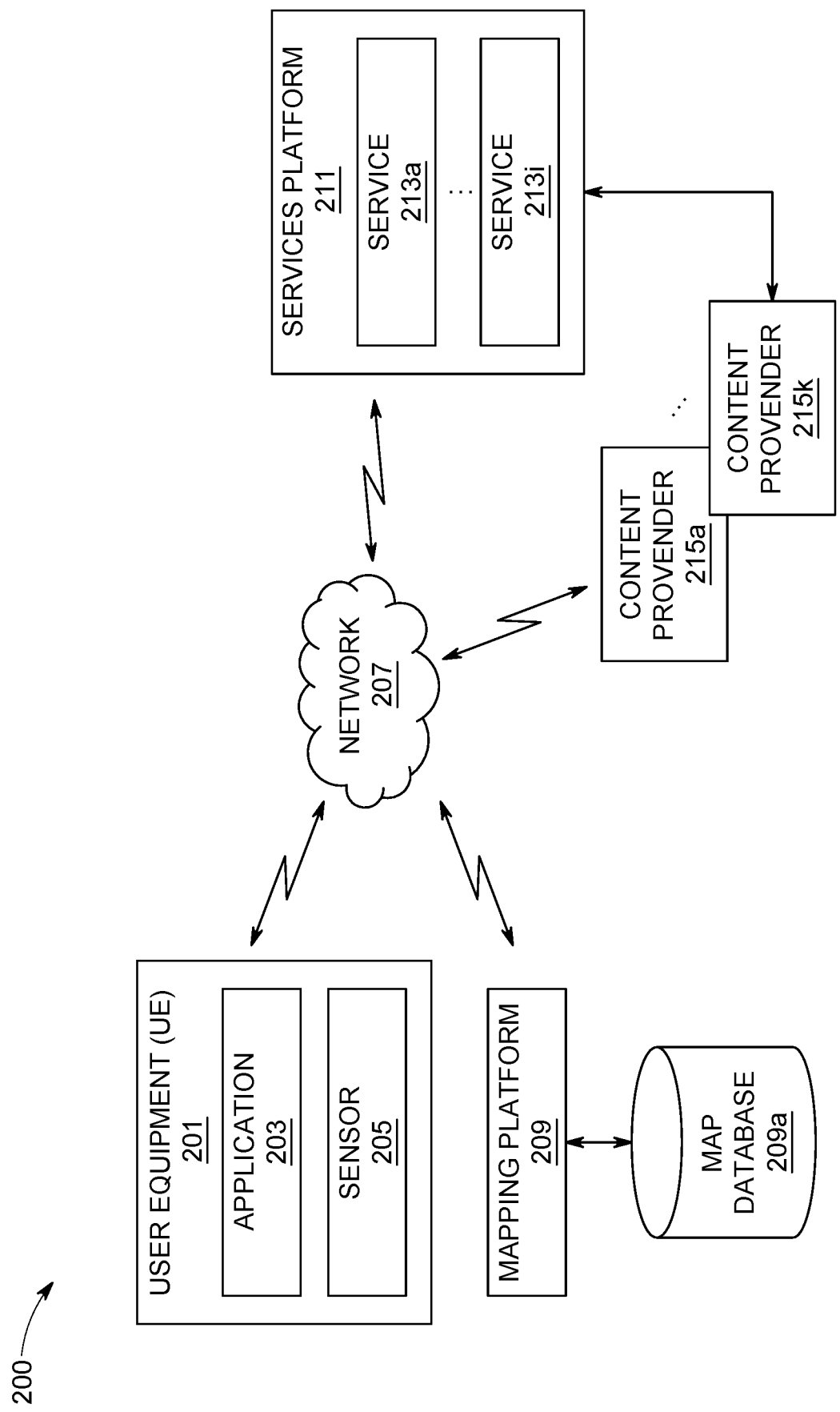
Figure 3:
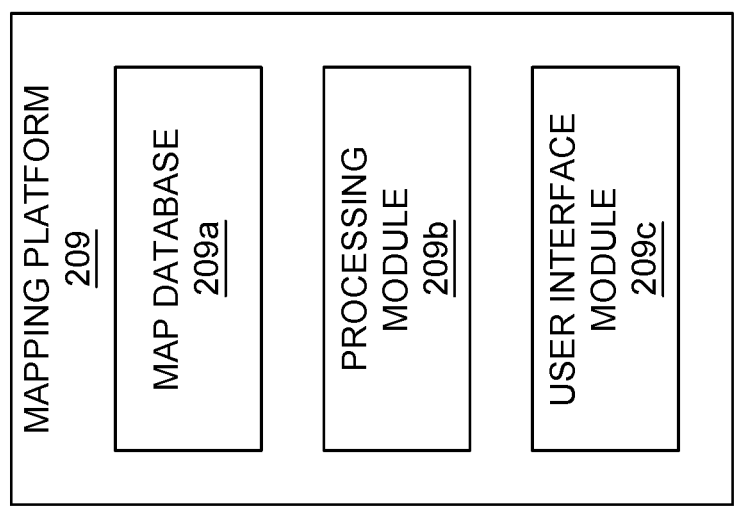
Figure 4:
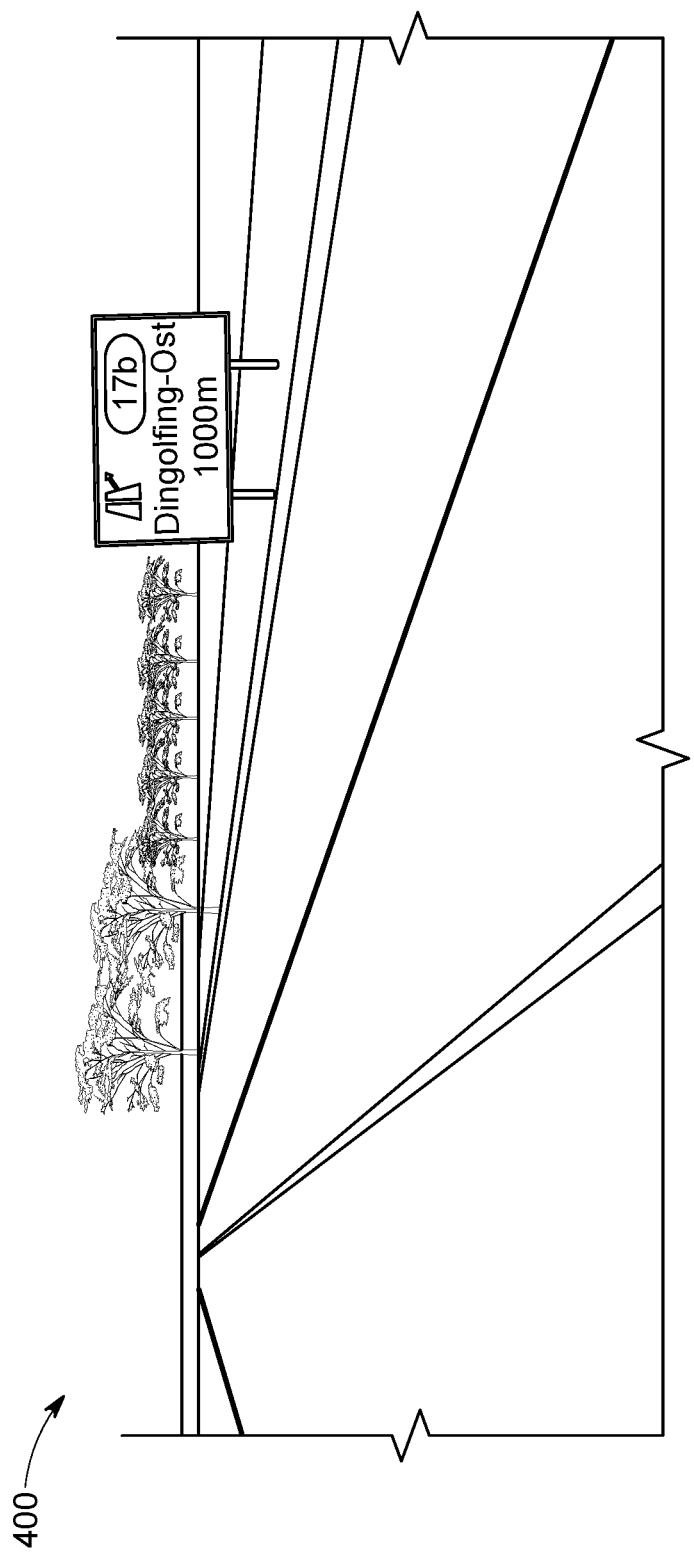
Figure 5A:
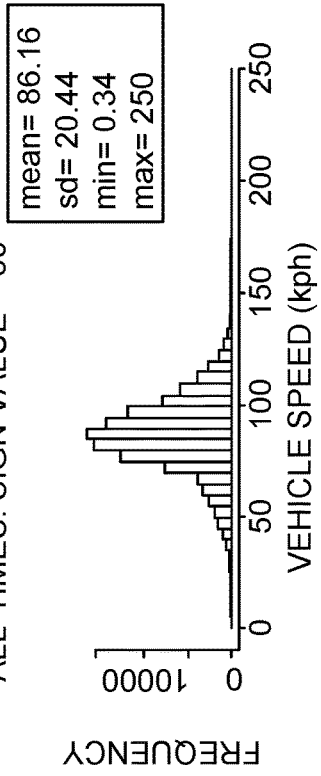
Figure 5B:
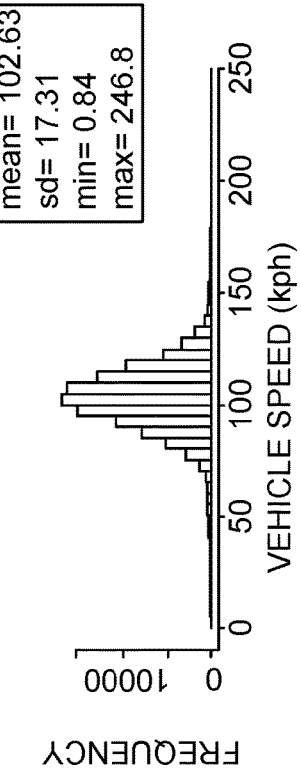
Figure 5C:
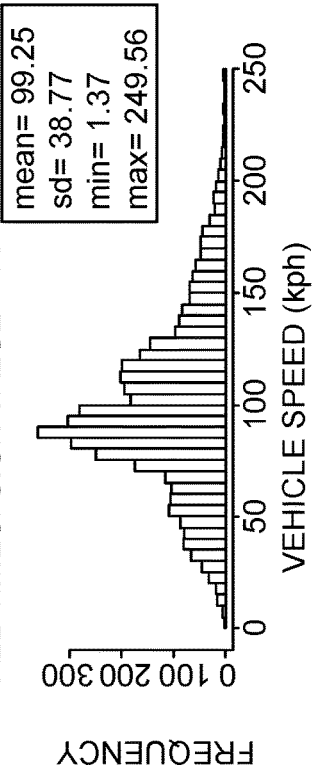
Figure 6:
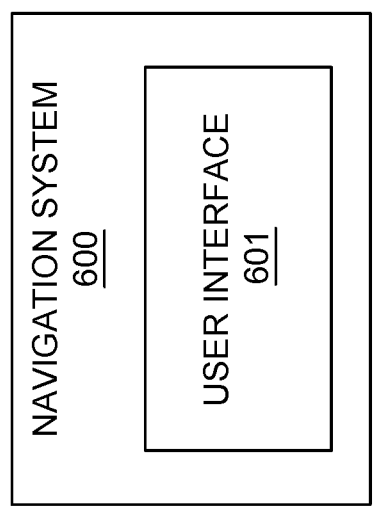
Figure 7:
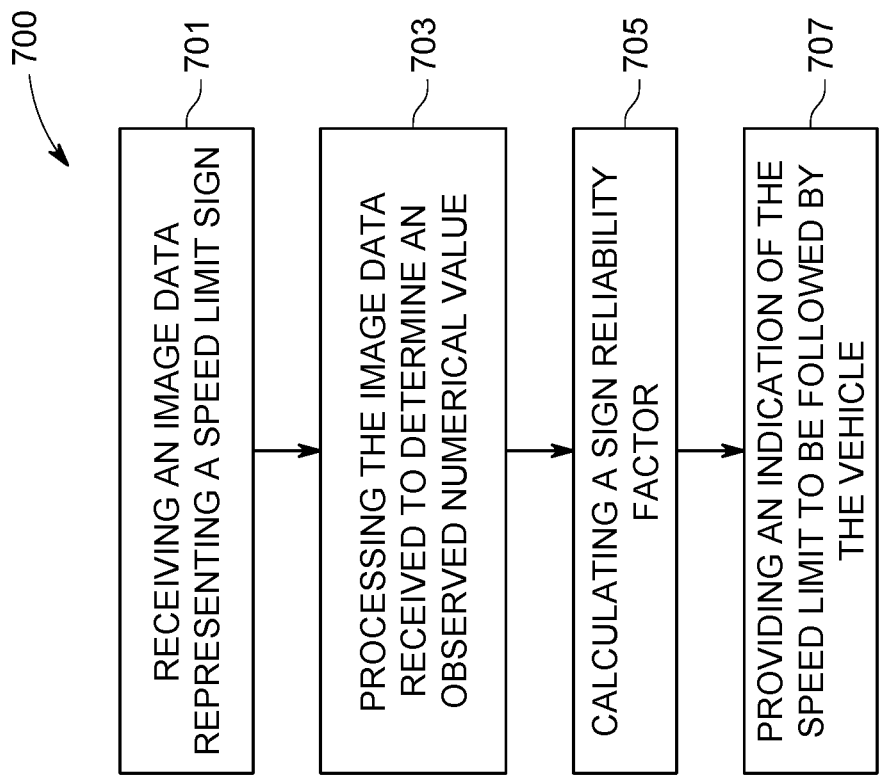
Figure 8:
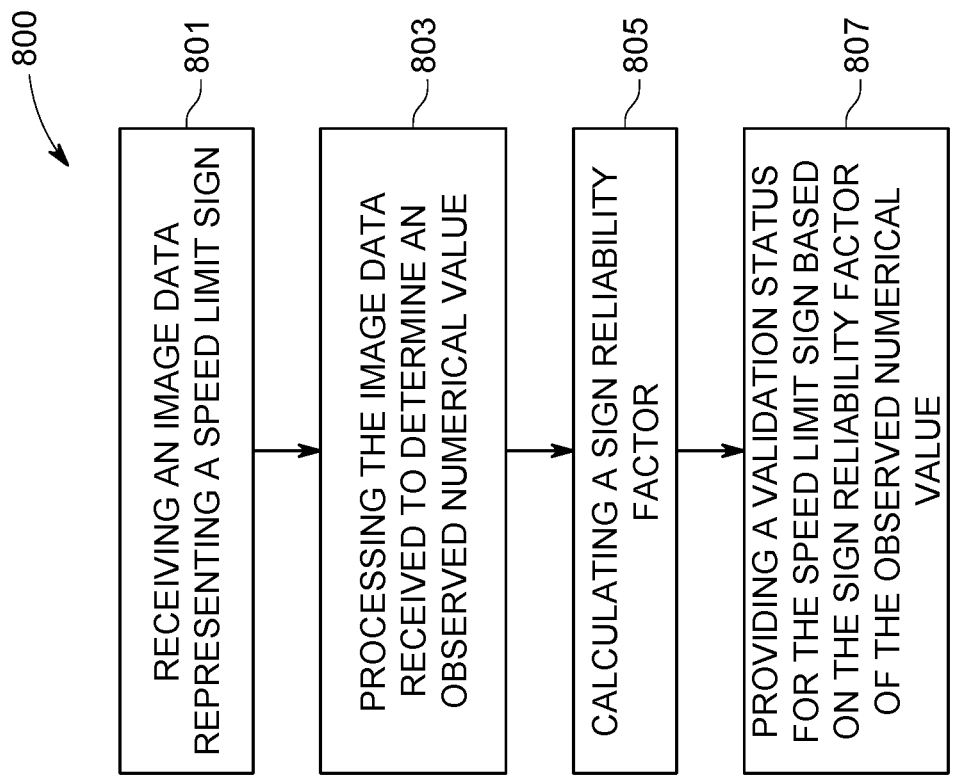

Having thus described example embodiments of the invention in general terms, reference will now be made to the accompanying drawings, which are not necessarily drawn to scale, and wherein:

FIG. 1 illustrates a block diagram of a system for providing speed limit related recommendation for a vehicle in accordance with an example embodiment;

FIG. 2 illustrates another block diagram of a system for providing speed limit related recommendation for a vehicle using a mapping platform in accordance with an example embodiment;

FIG. 3 illustrates an exemplary block diagram of a mapping platform for providing speed limit related recommendation according to an example embodiment;

FIG. 4 illustrates a posted sign to be validated according to an example embodiment;

FIGS. 5A-5C illustrates a distribution of speed limit data for providing validation of a posted sign according to an example embodiment;

FIG. 6 illustrates a navigation system for providing speed limited related recommendation in a vehicle according to an example embodiment;

FIG. 7 illustrates a flow diagram of a method for providing a speed limit related recommendation according to an example embodiment;

FIG. 8 illustrates a flow diagram of another method for providing a validation for a posted sign according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference, numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Currently, navigation systems in vehicles are configured for collecting data related to vehicle's environment based on one or more sensors provided in the vehicle. The one or more sensors may either be associated with the vehicle or may be provided in the vehicle. Such sensors may include, such as an image capturing device, a camera, a mobile device based camera and the like. The environment related data collected by the one or more sensors may relate to such as prescribed speed limit data posted on speed limit signs, accident conditions on the road, construction related updates on a route of the vehicle, diversion related updates posted on diversion signs on roads, any posted sign on the road and the like. The speed limit signs may be provided anywhere on a road or link on which the vehicle is travelling, such as on sides of links or above on a gantry. Such speed limit signs may be detected by an image capturing device. In some example embodiments, the image capturing device may be a camera of a mobile device carried in the vehicle. In some other example embodiments, the image capturing device may be an on-board camera system and image recognition techniques provided on the vehicle. The data collected by the on-board camera may be further used by the navigation system on the vehicle to adjust a speed limit of the vehicle. The navigation system may be manufactured by an original equipment manufacturer (OEM). In some examples, the OEM may provide the data collected by the image capturing device for updating a map database.

Such map database may be maintained by content providers, such as a map service provider. The map database may receive data related to posted signs from a plurality of vehicle sensors using crowdsourcing techniques. The received data may then be used to provide a classification of posted signs on roads. However, such classification may not be very accurate, leading to misclassification of some non-speed limit signs as speed-limit signs. For example, a posted sign, such as a sign board indicating distance of a destination may be posted on a road side. In some instances, the OEM vehicle's image capturing system, such as a camera system, may misclassify the distance value as the speed limit value. However, using the methods and systems disclosed in the example embodiments provided herein, the OEM vehicle's camera system data might be augmented with data provided by the map service provider, to correctly classify the posted sign and adjust a speed of the vehicle accordingly. In addition to map service provider's data, the methods and systems provided herein take into consideration expected driving behavior of the user while travelling on a link, such as a stretch of road, to classify the sign board on the road. Thus, the methods and systems provided herein may be able to provide greater accuracy and reliability in classifying posted signs on road. The classification of the posted sign may be used to provide a recommendation to the user to adjust their vehicle speed according to a validity of posted sign.

FIG. 1 illustrates a block diagram of a system for providing speed limit related recommendation for a vehicle in accordance with an example embodiment. The system 100 includes a user equipment (UE) 101, which may be in communication with a mapping platform 105, over a network 103. The network 103 may be wired, wireless, or any combination of wired and wireless communication networks, such as cellular, Wi-Fi, internet, local area networks, or the like.

The user equipment 101 may be a navigation system, such as an advanced driver assistance system (ADAS), that may be configured to provide route guidance and navigation related functions to the user of a vehicle. The user equipment 101 may be installed in the vehicle and may be configured to provide a speed limit related recommendation to the user of the vehicle. The user equipment may also include an image capturing device, such as a camera.

The user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 105 via a processing component 109 through, for example, a mapping application, such that the user equipment 101 may provide navigational assistance to a user among other services provided through access to the mapping platform 105.

The mapping platform 105 may also include a map database 107, which may include node data, road segment data or link data, point of interest (POI) data, posted signs related data or the like. The map database 107 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 107 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 can include data about the POIs and their respective locations in the POI records. The map database 107 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 107 can include event data (e.g., traffic incidents, construction activities, scheduled events, unscheduled events, etc.) associated with the POI data records or other records of the map database 107 associated with the mapping platform 105. The map database 107 may additionally include data about traffic regulations, speed limits, posted traffic signs, posted speed limit signs, heading data and the like.

A content provider such as a map developer may maintain the mapping platform 105. By way of example, the map developer can collect geographic data to generate and enhance the mapping platform 105. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that can inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 107 of the mapping platform 105 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 101, for example. The navigation-related functions can correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the mapping platform 105 may be a master geographic database configured at a server side, but in alternate embodiments, a client side mapping platform 105 may represent a compiled navigation database that may be used in or with end user devices (e.g., user equipment 101) to provide navigation, speed adjustment and/or map-related functions. For example, the mapping platform 105 may be used with the end user device 101 to provide an end user with navigation features. In such a case, the mapping platform 105 can be downloaded or stored on the end user device (user equipment 101) which can access the mapping platform 105 through a wireless or wired connection, over the network 103.

In one embodiment, the end user device or user equipment 101 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 101 for navigation and map functions such as guidance and map display, adjusting of vehicle speed based on map data and user driving behavior. The user equipment 101 may include an application that may enable the user to access the mapping platform 105 for availing the functions disclosed above.

FIG. 2 illustrates another block diagram of a system 200 for providing speed limit related recommendation for a vehicle using a mapping platform in accordance with an example embodiment. The system 200 includes a user equipment 201, including an application 203 for accessing one or more map and navigation related functions. The user equipment 201 also includes a sensor 205 module. The sensor module may include sensors such as a camera, an acceleration sensor, a gyroscopic sensor, a LIDAR sensor, a proximity sensor, a motion sensor and the like. The data collected by the sensor module 205 may be used to gather information related to an environment of the vehicle. For example, one of the sensors may include an advanced image capturing and recognition module, which may be used to gather an image data related to a posted sign in vicinity of the vehicle. In some examples, the posted sign may be a speed limit sign. In other examples, the posted sign may be any other traffic road sign. The image data may be used to determine an observed numerical value for the vehicle, such as based on the speed limit sign. In one example, the image data may be processed by the application 203 running on the user equipment 201 to determine the observed numerical value for the vehicle. In one example, the observed numerical value may be a speed limit. In another example, the image data may be processed by a processing component on a map database, such as the processing component 109 of the mapping platform 105. The system 200 also depicts a mapping platform 209 including a map database 209a, which is similar to the mapping platform 105 depicted in FIG. 1.

Additionally, the system 200 may include a services platform 211, that may be used to provide navigation related functions and services 213a-213i to the application 203 running on the user equipment 201. The services 213a-213i may include such as navigation functions, speed adjustment functions, traffic related updates, weather related updates, warnings and alerts, parking related services, indoor mapping services and the like. The services 213a-213i may be provided by a plurality of content providers 215a-215k. In some examples, the content providers 215a-215k may access various SDKs from the services platform 211 for implementing one or more services.

In an example, the services platform 211 and the mapping platform 209 may be integrated into a single platform to provide a suite of mapping and navigation related applications for OEM devices, such as the user equipment 201. The user equipment 201 may be configured to interface with the services platform 211, the content provider's services 215a-215k, and the mapping platform 209 over a network 207. Thus, the mapping platform 209 and the services platform 211 may enable provision of cloud-based services for the user equipment 201, such as for providing speed limit related recommendation to the user of the vehicle carrying the user equipment 201.

FIG. 3 illustrates an exemplary block diagram of the mapping platform 209 for providing speed limit related recommendation according to an example embodiment.

In the embodiments described herein, the mapping platform 209 may be a cloud based platform that may be configured to provide data for retrieving various parameters and distributions for providing speed limit related recommendations. The data related to image data related to a speed limit sign, such as posted speed signs data, may be updated in real time based on data collected from an image capturing device and driving behavior data. The data may then be transmitted to the mapping platform 209 that may use the image data to calculate a sign reliability factor for the speed limit sign based on a function of at least the observed numerical value, a historic mean of one or more vehicle speeds at the time of sign observation and a standard deviation of the one or more vehicle speeds at the time of sign observation. The historic mean and standard deviation of the one or more vehicle speeds may be performed by a processing module 209b of the mapping platform 209. The sign reliability factor may be compared with a pre-defined threshold to provide an indication of the speed limit to be followed by the vehicle.

In an example, the sign reliability factor data, the historic mean data, the standard deviation data and data related to one or more thresholds may be stored in the map database 209a of the mapping platform 209.

The mapping platform 209 may also be used to provide computations of various data using the processing module 209b. The processing module 209b may be embodied in a number of different ways. For example, the processing module 209b may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing module 209b may include one or more processing cores configured to perform independently. A multi-core processor may enable multiprocessing within a single physical package. Additionally or alternatively, the processing module 209b may include one or more processors configured in tandem via the bus to enable independent execution of instructions, pipelining and/or multithreading. Additionally or alternatively, the processing module 209b may include one or processors capable of processing large volumes of workloads and operations to provide support for big data analysis.

In an example embodiment, the processing module 209b may be configured to execute instructions stored in a memory device or otherwise accessible to the processing module 209b. As such, whether configured by hardware or software methods, or by a combination thereof, the processing module 209b may represent an entity (for example, physically embodied in circuitry) capable of performing operations according to an embodiment of the present invention while configured accordingly. Thus, for example, when the processing module 209b is embodied as an ASIC, FPGA or the like, the processor may be specifically configured hardware for conducting the operations described herein. Alternatively, as another example, when the processing module 209b is embodied as an executor of software instructions, the instructions may specifically configure the processing module 209b to perform the algorithms and/or operations described herein when the instructions are executed. However, in some cases, the processing module 209b may be a processor specific device (for example, a mobile terminal or a fixed computing device) configured to employ an embodiment of the present invention by further configuration of the processing module 209b by instructions for performing the algorithms and/or operations described herein. The processing module 209b may include, among other things, a clock, an arithmetic logic unit (ALU) and logic gates configured to support operation of the processing module 209b.

In some embodiments, the processing module 209b may be configured to provide Internet-of-Things (IoT) related capabilities to users of the parking recommendation system disclosed herein. The IoT related capabilities may in turn be used to provide smart city solutions by providing real time parking updates, big data analysis, and sensor based data collection by using the cloud based mapping platform 209 for providing navigation and parking recommendation services.

In some embodiments, the mapping platform 209 may be configured to provide an environment for development of speed limit related recommendation solutions for navigation systems in accordance with the embodiments disclosed herein. The environment may be accessed using a user interface module 209c of the mapping platform 209 disclosed herein. The user interface module 209c may provide an interface for accessing various features and data stored in the mapping platform 209.

In some embodiments, the mapping platform 209 may be configured to provide a repository of algorithms for implementing a plurality of location based services for navigation systems. For example, the mapping platform 209 may include algorithms related to geocoding, routing, machine learning in location based solutions, natural language processing algorithms, artificial intelligence algorithms, algorithms for calculating mean and standard deviations for sign reliability factor and the like. The algorithms may be used to implement solutions for providing a validation status for the posted sign. In some examples, a posted sign, such as a road sign may be misclassified as a speed limit sign by user equipment, such as a navigation device. Thus, the algorithm discussed above may help in validating the road sign to correctly classify it as a road sign and not a speed limit sign.

FIG. 4 illustrates a posted sign such as a road sign to be validated according to an example embodiment. The FIG. 4 illustrates a vehicle moving at some latitude and longitude coordinates known using map database. The vehicle may observe a posted sign, such as the illustrated road sign with value 17b on the right. The observation may be based on image recognition using one or more image capturing devices.

In some examples, the road sign may be misclassified as a posted speed limit sign by the vehicle, with a speed limit value of 70 KPH. However, at the time of observation of the road sign, the vehicle may be travelling at 100 KPH. Thus, in some example embodiments, a navigation system installed in the vehicle may suppress the observation of the posted speed limit sign as it is determined that the road sign has been misclassified as the posted speed limit sign.

Thus, using the methods and systems disclosed herein the navigation system installed in the vehicle, such as the user equipment 101 illustrated in the FIG. 1, may use the vehicle's observed speed and use a sign reliability factor for the observed road sign to validate whether the road sign is correct or not. If the sign reliability factor of the observed numerical value is above the pre-defined threshold, the road sign may be a valid sign the and the observed numerical value may be the speed limit to be followed or to be learned and updated to the map database 107.

However, if the sign reliability factor of the observed numerical value is below the pre-defined threshold, the indicated speed limit for the vehicle is a speed limit available on a mapping database. The sign reliability factor may be calculated on the basis of a function of at least the observed numerical value, a historic mean of one or more vehicle speeds at the time of sign observation and a standard deviation of the one or more vehicle speeds at the time of sign observation.

In an example embodiment, calculating the sign reliability factor comprises using a quality parameter based on a type of the vehicle that is providing the observation of the posted sign.

In an example embodiment, calculating the sign reliability factor comprises using a weightage factor based on absolute z-value of the one or more vehicle speeds at the time of sign observation.

In an example embodiment, once the sign reliability factor has been compared against the predetermined threshold, a speed of the vehicle may be adjusted based on the result of the comparison. Or a speed value in digital map may be changed based on that comparison.

In an example embodiment, once the sign reliability factor has been compared against the predetermined threshold, a speed limit available on a mapping database may be updated with the observed numerical value, when the sign reliability factor of the observed numerical value is above the pre-defined threshold.

In an example embodiment, the calculation of the sign reliability factor may be based on parameters derived on the basis of observed vehicle speeds over a period of time, such as a distribution of vehicle speeds at the time of a sign observation. The parameters derived for sign reliability factor calculation may be a historic mean of one or more vehicle speeds at the time of sign observation and a standard deviation of the one or more vehicle speeds at the time of sign observation. These parameters may be indicative of a driver's behavior while driving the vehicle.

For example, the parameters historic mean and standard deviation of one or more vehicle speeds may be used to implement an algorithm to determine the sign reliability for an observed speed limit sign.

In an example embodiment, the algorithm may be stored in the mapping platform 105 and may be used by the processing module 109 of the mapping platform 105 to determine the sign reliability of the speed limit sign. In an example embodiment, the observations for executing the steps of the algorithm may be suppressed during peak time hours, such as morning and evening rush hours. The observations may also be suppressed during anomaly situations, such as accidents, calamities, construction and the like, using sign observation timestamp data. Further, the observations may also be suppressed for links outside a prescribed category, such links that are not FC1 and FC2 roads. This may be due to the fact that for FC1 and FC2 roads traffic normally flows steadily in the absence of rush hour, broken down vehicle, accidents, or events. However, on FC4 and FC5 vehicle speed may vary due to road properties such as speed bumps, stop signs and the like. This may be done, such as in a map matching step. The map matching step may be used to associate GPS coordinates of the link with a road network. During map matching the matched link's identification is derived. Thereafter, the functional class (FC) of the link may be used to query a map database that contains link attributes, based on the link's identification. Based on the results of the query, one or more observations for executing the steps of the algorithm may be taken.

The observations may be used to implement the algorithm only if the number of observation of a learned sign (i.e. n) is >3. In such a scenario, if s is the non-zero speed limit observed by the vehicle;

μ is the mean of vehicle speed at the time of sign observation in the last 24 hours and σ is the standard deviation, an absolute z value may be determined as:

$$z=|\mu-s|/\sigma$$

Based on the above calculation, a standard error may be computed as:

$\sigma_m = \sigma/\sqrt{n}$, where n is the number of unique vehicle observations of the sign in the last 24 hours Further, a determination may be made regarding weights based on the absolute z value and the standard error such that:

a lower absolute z value is weighted more. The weight may be calculated as:

$\text{weight}_{z\ value} = 1 - e^{-d/z}$, such that $d$ is a configurable parameter whose value is initially 1

Further, a lower standard error is weighted more because lower standard deviations and more vehicle observations may be desired. Thus another weight factor may be calculated as:

$\text{weight}_{standard\ error} = 1 - e^{f/\sigma_m}$, such that $f$ is a configurable parameter whole value is initially 50

To account for potentially different quality of different OEM data, a quality factor per OEM/vehicle type may be used, which may be used as follows:

Determine the total weight as: $\text{weight}_{total} = \text{weight}_{z\ value} * \text{weight}_{standard\ error} * Q$ Currently all the vehicles have the same Q.

Based on all the parameters calculated above, the sign reliability factor may be determined based on driver behavior as follows:

sign $\text{reliability}_{driver\ behavior} = 1 - (1 - x*\text{weight}_{total})^y$ such that x=0.7 and y=0.9 and are both configurable If sign $\text{reliability}_{driver\ behavior}$>threshold (for example is threshold is 0.3) accept the detected sign as reliable, otherwise replace the reported sign with the map's speed limit.

The calculation of the sign reliability factor as above may thus be based on a distribution of values of speed limit data.

FIGS. 5A-5C illustrates a distribution of speed limit data for providing validation of a posted sign according to an example embodiment. FIGS. 5A and 5B illustrate that mean speed of vehicles is not significantly different from the observed numerical value, wherein the observed numerical value sign is an observed speed limit sign for real posted speed limit signs. FIG. 5C illustrates that mean speed of vehicles is significantly different from the observed speed limit sign for misclassified posted signs. In other words, the mean is significantly different from the sign's value and the standard deviation is also high.

These observations may be based on the assumptions that outside of peak travel time (such as morning rush hour, evening rush hour) and anomalies such as accidents drivers tend to drive at or around the speed limit. Thus the speed of the vehicle at the time of sign observation may be used in a function to compute a reliability score. Further, it may be assumed that in most cases, even though the vehicle misclassifies the posted non-speed limit sign as a speed limit sign, the driver of the vehicle is aware of the correct speed limit and thus continues to drive at a speed that is close to the correct speed limit.

FIG. 6 illustrates a navigation system 600 for providing speed limited related recommendation in a vehicle according to an example embodiment.

The navigation system 600 may include a user interface 601 for displaying a speed limit value to a user in the vehicle. In an example, the speed limit value may be determined based on observing a road sign in the vicinity of the vehicle.

In some example embodiments, the speed limit value may provide an indication of a speed limit value to be followed by the vehicle.

In some example embodiments, the speed limit value may be used to update a mapping application database, such as the map database 107 of the mapping platform 105 illustrated in FIG. 1.

In some example embodiments, the speed limit value may be determined based on a reliability score of the posted sign. For example, if it is determined based on the reliability score that the posted sign is not a valid speed limit sign, the speed limit value may be the actual speed of the vehicle at the time of observation of the posted road sign. However, if the posted sign is a valid speed limit sign, as determined based on the reliability store, the speed limit value displayed on the user interface 601 may be the recommended speed limit for the vehicle based on the posted road sign.

FIG. 7 illustrates a flow diagram of method 700 for providing a speed limit related recommendation according to an example embodiment. The method may include, at 701, receiving an image data representing a posted sign in the vicinity of a vehicle. The image data may be obtained by using one or more image capturing systems, such as a camera system installed in the vehicle. The image data may provide a data indicative of the posted sign observed on a link, such as on a side of a road, when the vehicle reaches near the posted sign. The method may further include, at 703, processing the received image to determine an observed numerical value. In one example embodiment, the processing may be performed by a processing component within a navigation system, such as the user equipment 101 installed in the vehicle. In another example embodiment, the processing may be performed by a processing component of a mapping platform, such as the processing component 109, of the mapping platform 105. Once observed numerical value has been determined, the method 700 may further include, at 705, calculating a sign reliability for the observed numerical value sign. The observed numerical value may be an observed speed limit and the observed numerical value sign may be an observed speed limit sign. The sign reliability factor may be calculated on the basis of a function of at least the observed numerical value, a historic mean of one or more vehicle speeds at the time of sign observation and a standard deviation of the one or more vehicle speeds at the time of sign observation. Once, the sign reliability factor has been calculated, the method 700 may further include, at 707, providing data for an indication of the speed limit to be followed by the vehicle. In one example, the indication may be provided on a user interface, based on the sign reliability factor of the observed numerical value being above or below a pre-defined threshold. The user interface may be such as a display of the navigation device installed in the vehicle.

In an example, the indication may be provided by displaying that the observed numerical value is a speed limit value which is correct, when the sign reliability factor of the observed numerical value is above the pre-defined threshold.

In an example, the indication may be provided by displaying that the observed numerical value is a misclassification as a speed limit, when the sign reliability factor of the observed numerical value is below the pre-defined threshold.

In an alternate embodiment, the comparison of the sign reliability factor may be used to validate a posted sign as correct or incorrect, such as shown in the method of FIG. 8. FIG. 8 illustrates a flow diagram of another method 800 for providing a validation for a posted sign. The method 800 may include, at 801, receiving an image data representing a posted sign, in a vicinity of a vehicle, the image data being detected by one or more image capturing devices, such as one or more cameras on the vehicle. The method 800 may further include, at 803, processing the image data received to determine an observed numerical value. Further, the method 800 may include, at 805, calculating, by a processor, a sign reliability factor based on a function of at least the observed numerical value, a historic mean of one or more vehicle speeds at the time of sign observation and a standard deviation of the one or more vehicle speeds at the time of sign observation. Additionally, the method 800 may include, at 807, providing a validation status for the posted sign based on the sign reliability factor of the observed numerical value being above or below a pre-defined threshold.

In an example embodiment, the method 800 may include providing a validation status for the posted sign based on the sign reliability factor of the observed numerical value being above or below a pre-defined threshold, wherein the validation status for the posted sign is used by the navigation system to adjust a speed of the vehicle, such as in the case of an autonomous or a semi-autonomous vehicle.

In an example embodiment, the validation status of the posted sign is used to update a map database regarding the validity status of the sign and/or is used to filter the observation.

In an example embodiment, the validation status of the posted sign is used to provide recommendation for a speed limit for the vehicle.

In an example embodiment, an apparatus for performing the methods 700 and 800 of FIGS. 7 and 8 above may comprise a processor (e.g. the processor 109) configured to perform some or each of the operations of the methods FIG. 7 and FIG. 8 described previously. The processor may, for example, be configured to perform the operations (701-707) and (801-807) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (701-707) and (801-807) may comprise, for example, the processor 109 which may be implemented in the user equipment 101 and/or a device or circuit for executing instructions or executing an algorithm for processing information as described above.

The same implementation can obviously be duplicated to many other driving maneuvers and restrictions, allowing implementation of semi-autonomous or fully autonomous functionality in vehicles.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for providing a speed limit related recommendation to a user of a vehicle, the method comprising:
   receiving an image data representing a posted sign, in a vicinity of the vehicle, the image data being detected by one or more image capturing devices;
   processing the image data received to determine an observed numerical value;
   calculating, by a processor, a sign reliability factor based on a function of at least the observed numerical value, a historic mean of one or more vehicle speeds at the time of sign observation and a standard deviation of the one or more vehicle speeds at the time of sign observation; and
   providing data for an indication of a speed limit to be followed by the vehicle, on a user interface, based on the sign reliability factor of the observed numerical value being above or below a pre-defined threshold.

2. The method of claim 1, wherein the data for the indicated speed limit to be followed by the vehicle is the data for observed numerical value based on determining that the sign reliability factor of the observed numerical value is above the pre-defined threshold.

3. The method of claim 1, wherein the data for the indicated speed limit to be followed by the vehicle is a data for a speed limit available on a mapping database based on determining that the sign reliability factor of the observed numerical value is below the pre-defined threshold.

4. The method of claim 1, wherein calculating the sign reliability factor further comprises using a quality parameter based on a type of the vehicle.

5. The method of claim 1, wherein calculating the sign reliability factor further comprises using a weightage factor based on absolute z-value of the one or more vehicle speeds at the time of sign observation.

6. The method of claim 1, further comprising updating a speed limit available on a mapping database with the observed numerical value based on determining that the sign reliability factor of the observed numerical value is above the pre-defined threshold.

7. The method of claim 1, further comprising providing other data for determining a validation status for the posted sign based on the sign reliability factor of the observed numerical value being above or below the pre-defined threshold.

8. A navigation system comprising:
  a user interface to provide a speed limit related recommendation to a user of a vehicle;
  at least one processor; and
  at least one non-transitory memory including computer program code instructions, the computer program code instructions configured to, when executed, cause the system to at least:
    receive an image data representing a posted sign, in a vicinity of the vehicle, the image data being detected by one or more image capturing devices;
    process the image data received to determine an observed numerical value;
    calculate, using the processor, a sign reliability factor based on a function of at least the observed numerical value, a historic mean of one or more vehicle speeds at the time of sign observation and a standard deviation of the one or more vehicle speeds at the time of sign observation; and
    provide data to display on the user interface, an indication of the speed limit to be followed by the vehicle, based on the sign reliability factor of the observed numerical value being above or below a pre-defined threshold.

9. The navigation system of claim 8, wherein the data for the indicated speed limit to be followed by the vehicle is the data for the observed numerical value based on determining that the sign reliability factor of the observed numerical value is above the pre-defined threshold.

10. The navigation system of claim 8, wherein the data for the indicated speed limit to be followed by the vehicle is a data for a speed limit available on a mapping database based on determining that the sign reliability factor of the observed numerical value is below the pre-defined threshold.

11. The navigation system of claim 8, wherein calculating the sign reliability factor further comprises using a quality parameter based on a type of the vehicle.

12. The navigation system of claim 8, wherein calculating the sign reliability factor further comprises using a weightage factor based on absolute z-value of the one or more vehicle speeds at the time of sign observation.

13. The navigation system of claim 8, wherein a speed limit available on a mapping database is updated with the observed numerical value based on determining that the sign reliability factor of the observed numerical value is above the pre-defined threshold.

14. The navigation system of claim 8, wherein the system is further caused to provide other data for determining a validation status for the posted sign based on the sign reliability factor of the observed numerical value being above or below the pre-defined threshold.

15. A computer program product comprising at least one non-transitory computer-readable storage medium having computer-executable program code instructions stored therein, the computer-executable program code instructions comprising program code instructions to:
  receive an image data representing a posted sign, in a vicinity of the vehicle, the image data being detected by one or more image capturing devices;
  process the image data received to determine an observed numerical value;
  calculate, using a processor, a sign reliability factor based on a function of at least the observed numerical value, a historic mean of one or more vehicle speeds at the time of sign observation and a standard deviation of the one or more vehicle speeds at the time of sign observation; and
  provide data for an indication of the speed limit to be followed by the vehicle, based on the sign reliability factor of the observed numerical value being above or below a pre-defined threshold.

16. The computer program product of claim 15, wherein the data for the indicated speed limit to be followed by the vehicle is the data for the observed numerical value based on determining the sign reliability factor of the observed numerical value is above the pre-defined threshold.

17. The computer program product of claim 15, wherein the data for the indicated speed limit to be followed by the vehicle is a data for a speed limit available on a mapping database based on determining that the sign reliability factor of the observed numerical value is below the pre-defined threshold.

18. The computer program product of claim 15, wherein calculating the sign reliability factor further comprises using a quality parameter based on a type of the vehicle.

19. The computer program product of claim 15, wherein calculating the sign reliability factor further comprises using a weightage factor based on absolute z-value of the one or more vehicle speeds at the time of sign observation.

20. The computer program product of claim 15 comprising further instructions to update a speed limit available on a mapping database with the observed numerical value based on determining that the sign reliability factor of the observed numerical value is above the pre-defined threshold.

* * * * *